(12) United States Patent
Dolla

(10) Patent No.: US 8,652,602 B1
(45) Date of Patent: Feb. 18, 2014

(54) ROTATIONAL EXPANSION AUXETIC STRUCTURES

(76) Inventor: William Jacob Spenner Dolla, Kansas City, MO (US)

(*) Notice: Subject to any disclaimer, the term of this patent is extended or adjusted under 35 U.S.C. 154(b) by 1231 days.

(21) Appl. No.: 12/038,415

(22) Filed: Feb. 27, 2008

Related U.S. Application Data

(60) Provisional application No. 60/891,979, filed on Feb. 28, 2007.

(51) Int. Cl.
*D03D 15/00* (2006.01)

(52) U.S. Cl.
USPC .......... 428/36.1; 428/377; 442/203; 442/204; 442/205; 442/206; 442/207; 442/301

(58) Field of Classification Search
USPC ................... 428/377, 36.1; 442/203–207, 301
See application file for complete search history.

(56) References Cited

U.S. PATENT DOCUMENTS

| | | | |
|---|---|---|---|
| 4,668,557 A | 5/1987 | Lakes | |
| 2005/0025948 A1* | 2/2005 | Johnson et al. | 428/223 |
| 2008/0011021 A1* | 1/2008 | Starbuck et al. | 66/170 |

FOREIGN PATENT DOCUMENTS

WO   WO 2004088015 A1 * 10/2004

OTHER PUBLICATIONS

Ray H. Baughman, et al.; Letters to Nature; vol. 392; "Negative Poisson's ratios as a common feature of cubic metals"; pp. 362-365; MacMillan Publishers Ltd. 1998; Mar. 26, 1998.
PH. Boulanger et al.; Journal of Elasticity; 50; "Poisson's Ratio for Orthorhombic Materials"; pp. 87-89; Kluwer Academic Publishers; 1998.
J.B. Choi et al.; Int. J. Fracture; 80; "Fracture Toughness of Re-entrant Foam Materials with a Negative Poisson's Ratio: Experiment and Analysis"; pp. 73-83; 1996.
P.J. Hine et al., Journal of Materials Science Letters; 16; "Negative Poisson's ratios in angle-ply laminates"; pp. 541-544; 1997.
Roderic Lakes; Science; vol. 235; "Foam Structures with a Negative Poisson's Ratio"; pp. 1038-1040; Feb. 27, 1987.
Thomas L. Warren; American Institute of Physics; 67; "Negative Poisson's ratio in a transversely isotropic foam structure"; pp. 7591-7594; Jun. 15, 1990.
Amir Yeganeh-Haeri et al., Science; vol. 257; No. 5070; "Elasticity of #-Cristobalite: A Silicon Dioxide with a Negative Poisson's Ratio"; pp. 650-652; Jul. 31, 1992.

* cited by examiner

*Primary Examiner* — Elizabeth Cole
(74) *Attorney, Agent, or Firm* — Erickson, Kernell, Derusseau & Kleypas, LLC

(57) ABSTRACT

Auxetic structures exhibiting negative Poisson's ratios are disclosed including planar auxetic structures formed from x-axis and y-axis strands of selected waveforms. Portions of the auxetic structure referred to as unit cells comprise four joints formed by two adjacent x-axis strands overlapping two adjacent y-axis strands display symmetry about x and y axes. Each unit cell comprises four sub-unit cells formed from segments of ½ wavelength of the wave form. The planar auxetic structures may be formed into three-dimensional auxetic structures or cylindrical or spherical auxetic structures.

25 Claims, 17 Drawing Sheets

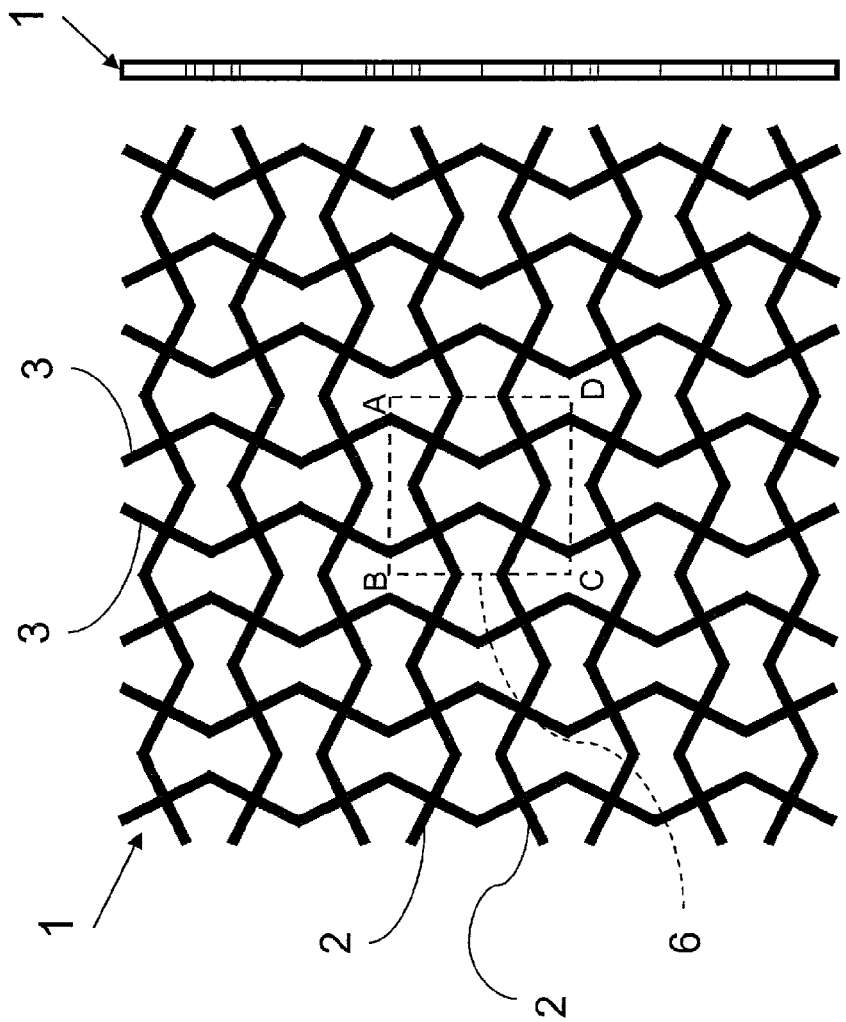
Fig. 4
Fig. 3
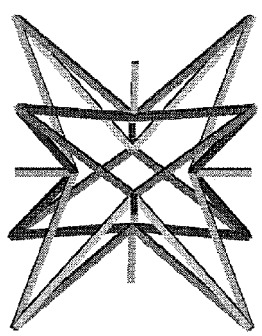
Fig. 1: Prior Art
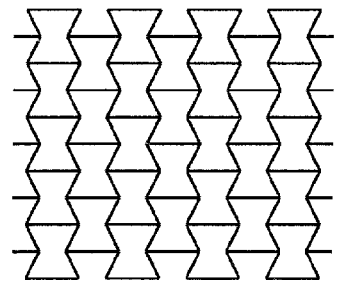
Fig. 2: Prior Art

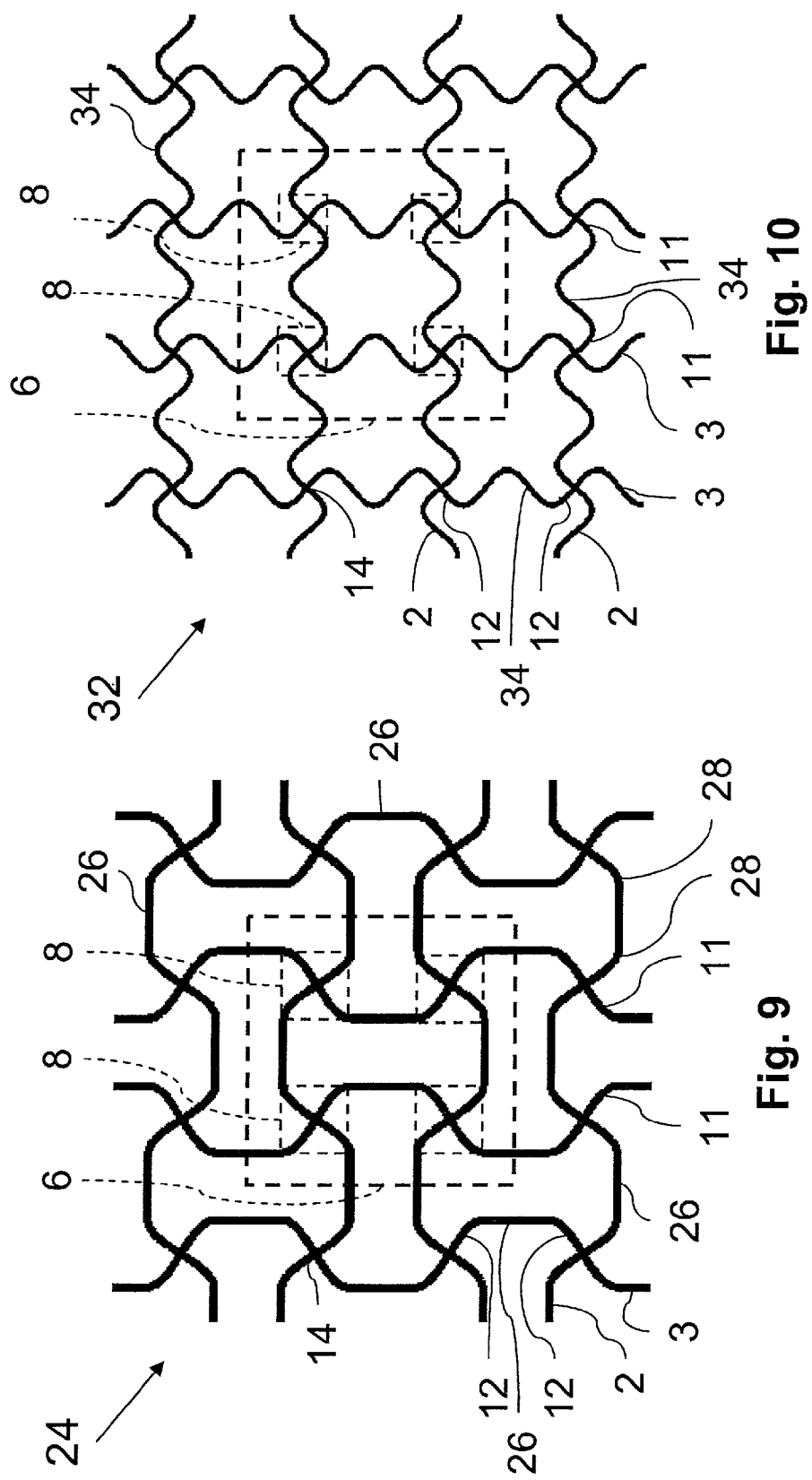

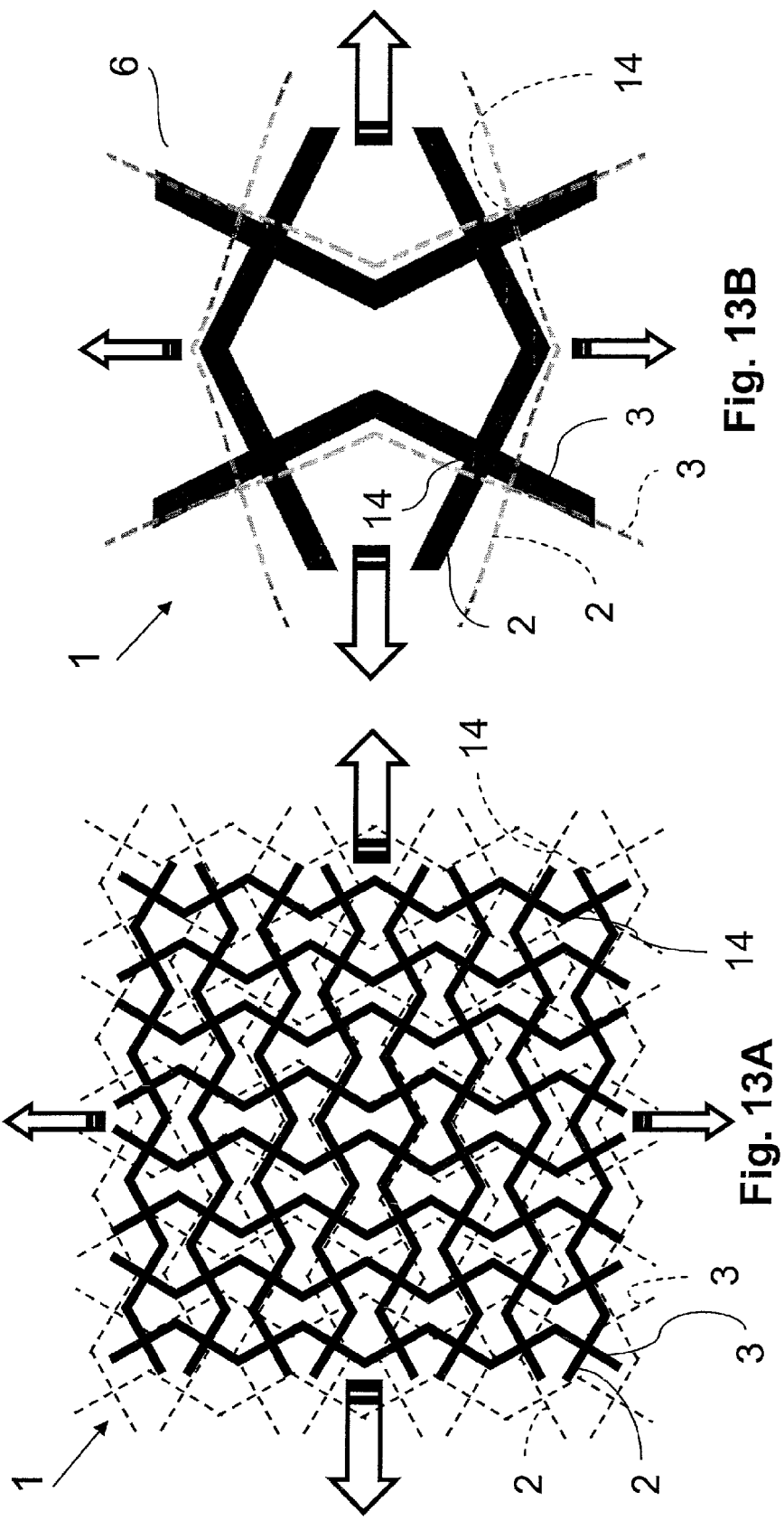

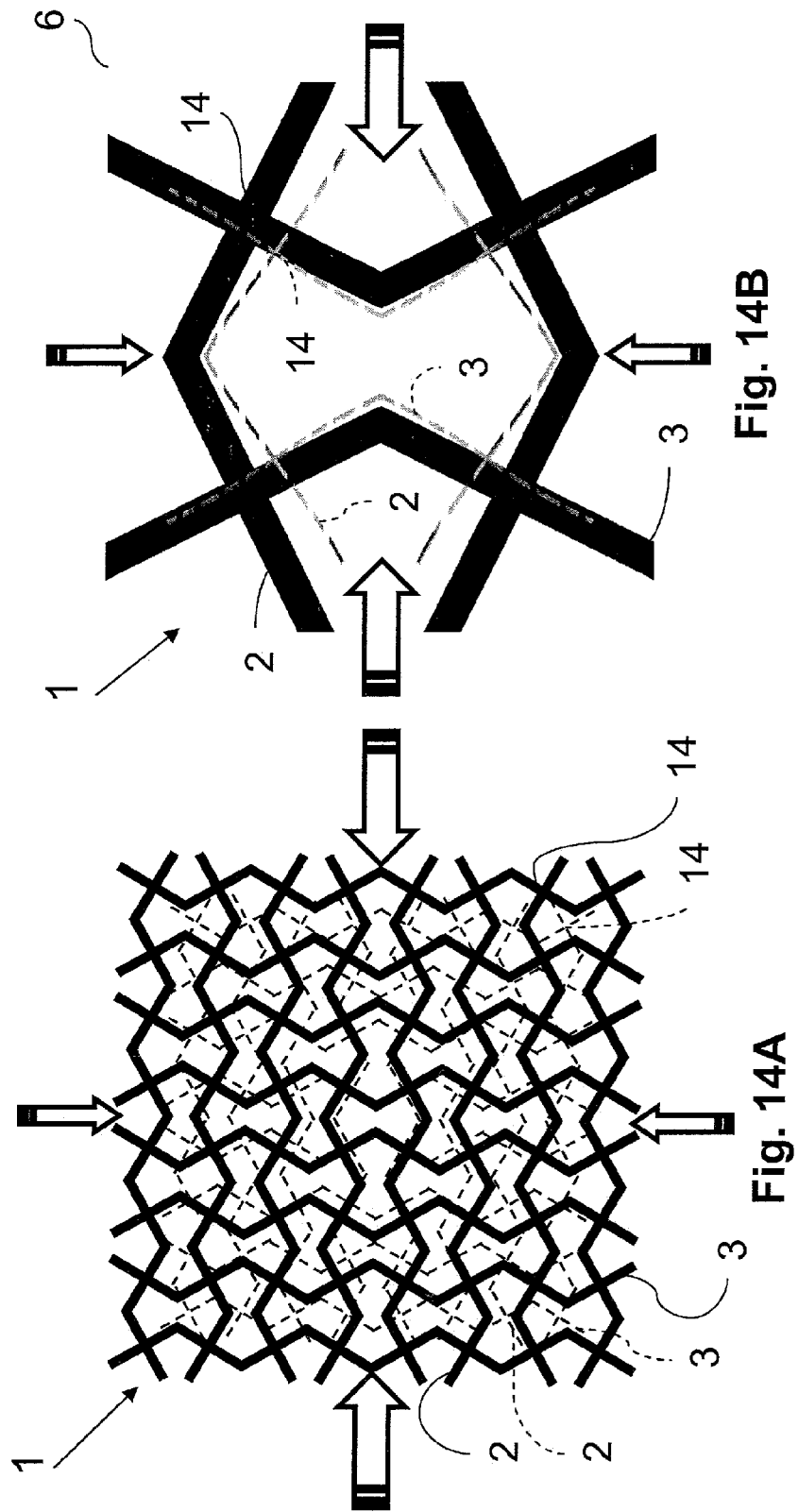

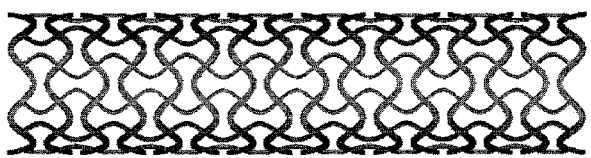
Fig. 18
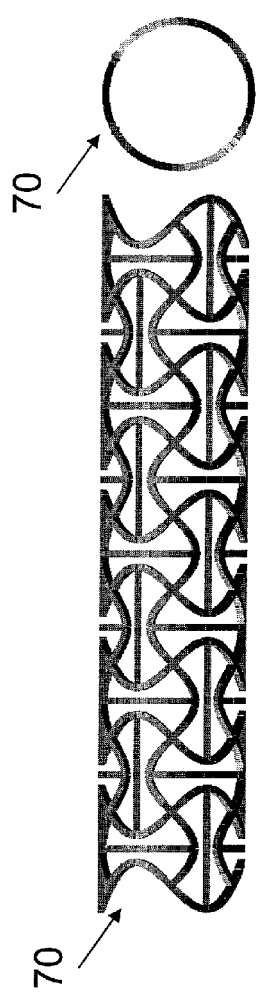
Fig. 17A
Fig. 17B
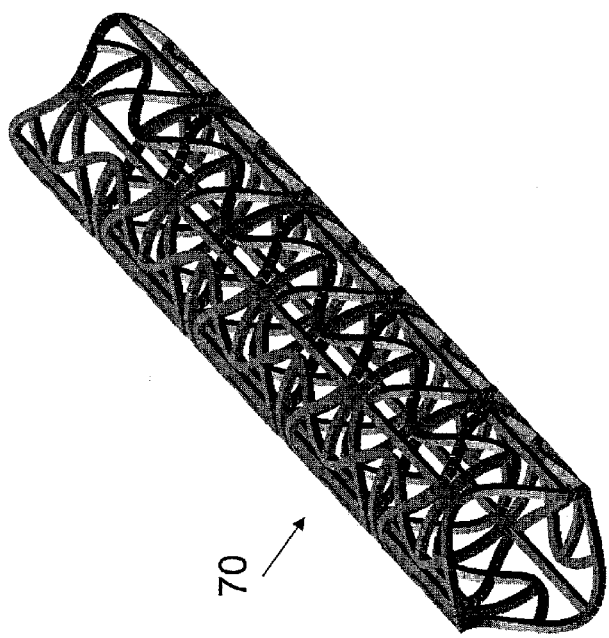
Fig. 17C

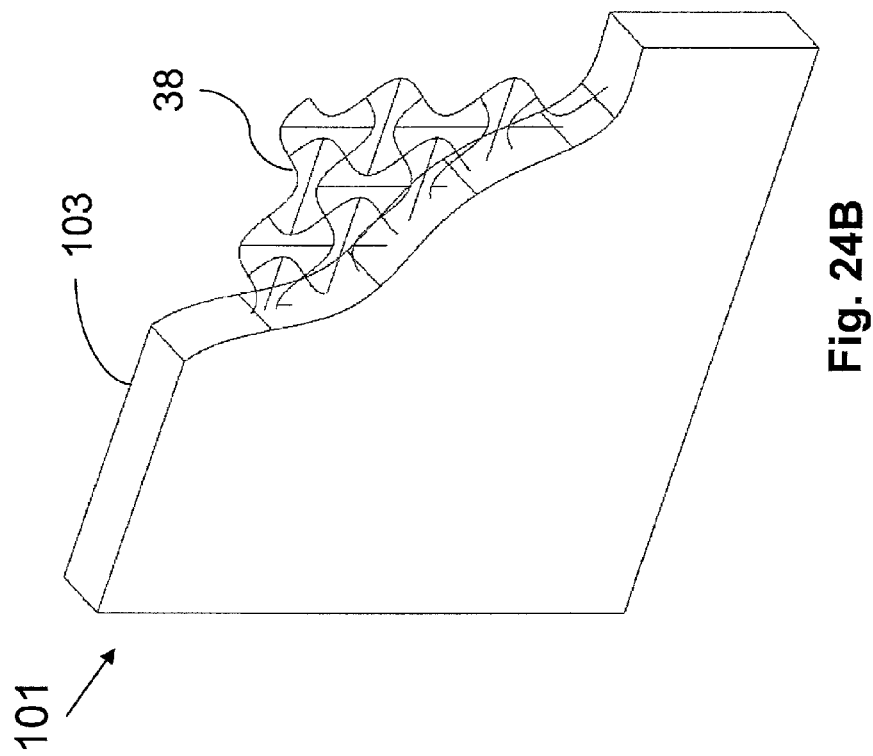
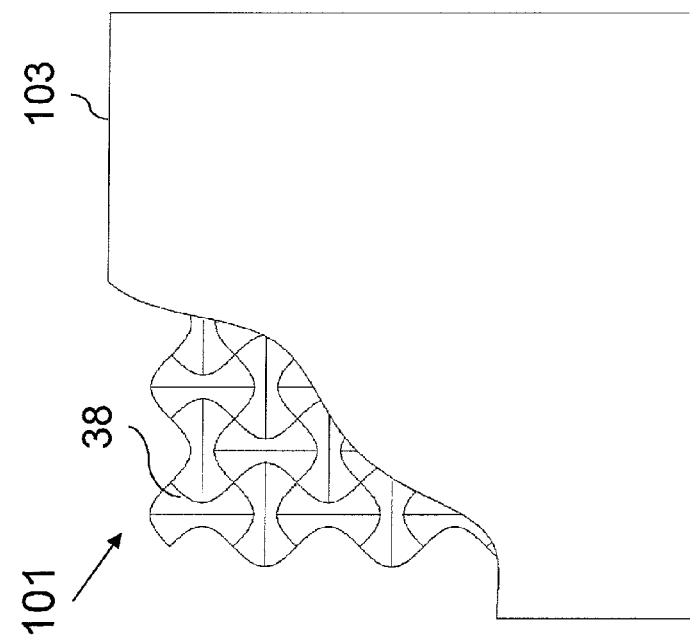
Fig. 24B
Fig. 24A

ROTATIONAL EXPANSION AUXETIC STRUCTURES

CROSS-REFERENCE TO RELATED APPLICATIONS

This application claims priority to U.S. Provisional Application No. 60/891,979 filed Feb. 28, 2007 entitled Design of Rotational Expansion Novel Auxetic Structures.

BACKGROUND OF THE INVENTION

Poisson's ratio is defined as the ratio of lateral contraction to the longitudinal extension of a material subjected to tensile loading, and the ratio of lateral expansion to the longitudinal contraction in case of compressive loading. Most engineering materials possess positive Poisson's ratios in the vicinity of 0.3, and incompressible rubbery polymers exhibit a Poisson's ratio close to 0.5. The thermodynamic constraint of positive elastic moduli, i.e. positive shear and bulk moduli, restricts Poisson's ratio between −1 and 0.5. Though theoretically not forbidden, materials exhibiting negative Poisson's ratio are uncommon. Such materials are referred to as auxetics, a term coined by Professor Ken Evans of Exeter University, derived from the Greek word 'auxesis,' which means 'increase' or 'grow.'

U.S. Pat. No. 4,668,557 to Lakes discloses a method of manufacturing auxetic open-cell foam based on a reentrant polyhedron structure as shown in FIGS. 1 and 2 of this application. The auxetic behavior of a-crystobalite, a SiO2 polymorph, has been demonstrated using Laser Brillouin spectroscopy. A few additional naturally occurring zeolites have been identified which exhibit auxetic nature, and others have theoretically predicted negative Poisson's ratio as a common feature of cubic metals, questioning the general belief of the rarity of naturally occurring auxetic materials. It has also been demonstrated by others that Poisson's ratio may not be bound between −1 and 0.5, a possibility characterized by the orthotropic constitutive equations and by positive definite energy density storage.

The physical explanation of the auxetic nature of the open-cell foam invented by Lakes, U.S. Pat. No. 4,668,557, is due to the unfolding lateral expansion of the strands of the reentrant polyhedron structure when subjected to tensile loads, involving three deformation mechanisms, namely, stretching, flexure, and hinging effects at the strand joints. On the other hand, the Possion's ratio has been experimentally determined to be as small as −0.8 for 3-dimensional reentrant foam structures, while approaching −1 by increasing volumetric compression ratio. The overall properties of the auxetic honeycomb structures are highly dependent on geometry, ranging from isotropic for regular hexagons to highly anisotropic, highly influenced by the variations in geometry. Numerical, analytical, and experimental procedures have proved that the mechanical properties of the conventional and reentrant honeycomb structures are highly dependent on relative density, which in turn is dependent upon the dimensions of the strands such as strand length, cross section, and angle. It has been reported that the Poisson's ratio becomes negative for a rib angle of 12.3° and a volume fraction of 0.1.

The present invention describes the design of a new class of auxetic structures termed as Rotational Expansion Novel Auxetic (RENA) structures. Auxetic materials of desired structural properties, i.e. stiffness and Poisson's ratios, can be tailor-made to an application at hand, using a wide variety of materials. Auxetic materials of various shapes and sizes, from nano-scale to mega-assemblies can be manufactured utilizing the developments in nanotechnology, manufacturing technologies, polymer chemistry, and structural engineering. Such tailor-made auxetic materials find applications in a wide variety of industries including biomedical and aerospace engineering.

SUMMARY OF THE INVENTION

A variety of unique planar, three dimensional, cylindrical, and spherical (polar) arrangements and their combinations designed based on auxetic unit cells comprising combinations of strands of varying wave forms and their connectors are disclosed. Application-specific auxetic materials of different scales and dimensions that exhibit desired structural properties, i.e. stiffness and Poisson's ratios, can be designed and manufactured based on these auxetic structures. Negative Poisson's ratio, high shear modulus and low bulk modulus, high fracture toughness, high impact resistance due to greater elastic energy absorption, and high indentation resistance are some of the inherent characteristics of such auxetic materials. These unique characteristics make auxetic structures or materials desirable for applications in a wide variety of industries including aerospace and biomedical engineering.

BRIEF DESCRIPTION OF THE DRAWINGS

FIG. 1 is an isometric view of a prior art reentrant polyhedron structure.

FIG. 2 is a front plan view of a prior art planar reentrant hexagonal structure.

FIG. 3 is a front plan view of a planar auxetic structure formed from strands of a triangular wave form and showing the unit cell ABCD outlined in broken lines.

FIG. 4 is a side view of the planar auxetic structure of FIG. 3.

FIG. 9 is a front plan view of an alternative embodiment of a planar auxetic structure formed from sinusoidal strands having sub-unit cell segments connected by linear connectors.

FIG. 10 is a front plan view of an alternative embodiment of a planar auxetic structure formed from sinusoidal strands having sub-unit cell segments connected by sinusoidal connectors.

FIG. 13A is a front plan view of the planar auxetic structure of FIG. 3, showing, in phantom lines, an expanded form of the auxetic structure when subjected to tension.

FIG. 13B is a front plan view of a unit cell of the planar auxetic structure of FIG. 3, showing, in phantom lines, an expanded form of the unit cell when subjected to tension.

FIG. 14A is a front plan view of the planar auxetic structure of FIG. 3, showing, in phantom lines, a contracted form of the auxetic structure when subjected to compressive loads.

FIG. 14B is a front plan view of a unit cell of the planar auxetic structure of FIG. 3, showing, in phantom lines, a contracted form of the unit cell when subjected to compressive loads.

FIG. 17A is a front plan view of a cylindrical auxetic structure with sinusoidal strands and linear cross links as in FIG. 11.

FIG. 17B is an end view of the cylindrical auxetic structure of FIG. 17A.

FIG. 17C is a perspective view of the cylindrical auxetic structure of FIG. 17A.

FIG. 18 is a front plan view of an alternative embodiment of a cylindrical auxetic structure with sinusoidal strands without cross-links and adapted for use as a cardiovascular stent.

FIG. 24A is a front plan view of composite structure formed by molding a plastic material around a planar auxetic structure.

FIG. 24B is a perspective view of the composite structure of FIG. 24A.

DETAILED DESCRIPTION OF THE INVENTION

Figure 5:
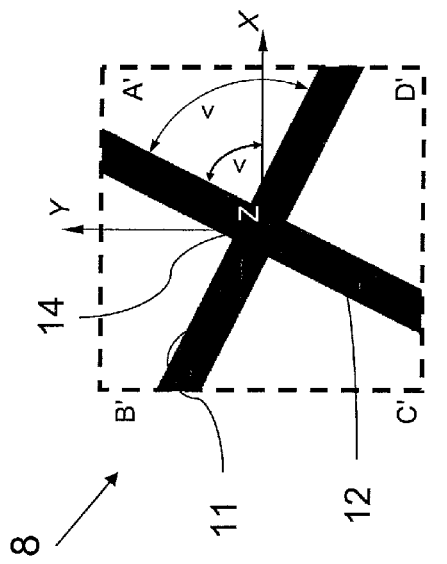
FIG. 5 is an enlarged and fragmentary front plan view of the unit cell ABCD of the auxetic structure shown in FIG. 3 showing the two orthogonal planes of symmetry YZ (designated by X) and ZX (designated by Y), and the sub-unit cell A'B'C'D' outlined in broken lines.

Referring to the drawings in more detail, a first embodiment of an auxetic structure 1, as shown in FIG. 3, can be formed to create a structure exhibiting a negative Poisson's ratio. The auxetic structure 1 as shown is planar. However, as will be discussed subsequently, the planar auxetic 1 structure can be used to create a three-dimensional auxetic structure, or the auxetic structure 1 may be utilized to form a cylindrical or spherical auxetic structure. Auxetic structure 1 generally comprises a lattice formed from a plurality of overlapping strands, including x-axis strands 2 and y-axis strands 3. The x-axis strands 2 generally extend parallel to a first or x-axis and the y-axis strands generally extend parallel to a second or y-axis. As used herein the strands may also be referred to as filaments, ligaments, wires, structural members or the like.

Each strand forms an oscillating pattern or wave with alternating peaks and valleys. The patterns of the waves of adjacent strands (both x-axis and y-axis) are offset 180 degrees such that the peaks and valleys of each strand are opposite valleys and peaks respectively of each adjacent strand. The pattern formed between adjacent strands alternates between a maximum spacing when the strands angle away from each other and minimum spacing when the strands angle toward each other. In the auxetic structure 1 shown in FIG. 3, the x-axis strands cross the y-axis strands at the midpoint between peaks and valleys. Similarly, the y-axis strands cross the x-axis strands at the midpoint between peaks and valleys. In a preferred embodiment, the x and y axis strands 2 and 3 cross at an angle of 90 degrees or transverse to one another. The wave form or pattern of the strands 2 and 3 of FIGS. 3, 5 and 6 is triangular.

Referring again to FIG. 3, the portion of the lattice 1 circumscribed by the box ABCD may be referred to as a unit cell 6 of the lattice 1 which is repeated throughout the lattice 1. The unit cell 6 is shown separately in FIG. 5. This unit cell 6 may be further broken down into sub-unit cells 8 as shown in FIG. 6 and circumscribed by the box A'B'C'D' in FIG. 5.

Figure 6:
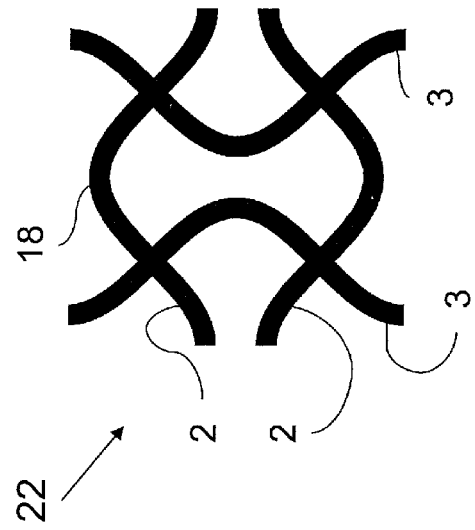
FIG. 6 is an enlarged and fragmentary front plan view of the sub-unit cell A'B'C'D' as shown in FIG. 5 showing strands joined at joint 14

The unit cell 6 of the planar auxetic structure exemplified in FIG. 3 is a double-symmetrical arrangement of a sub-unit cell 8 about the two orthogonal planes YZ (designated by X) and ZX (designated by Y), as shown in FIG. 5. More specifically, each sub-unit cell 8 is symmetrical with and a mirror image of adjacent sub-unit cells 8 across the X axis and the Y axis. The sub-unit cell 8 is comprised of two sub-unit cell segments 11 and 12 of desired dimensions and cross section joined at an angle α at a joint or node 14, with sub-unit cell segment 11 oriented at an angle β to the principal coordinate direction X, as shown in FIG. 6. The joints or nodes 14 are formed where the x-axis strands 2 and the y-axis strands 3 intersect. The position of the x-axis strand 2 relative to the y-axis strand 3 at each joint 14 is fixed such that the x-axis and y-axis strands 2 and 3 do not move relative to one another at the joints 14. In the auxetic structure 1, each sub-unit cell segment 11 and 12 has a length of half the wavelength of the wave pattern forming the x and y axis strands 2 and 3. In addition, each sub-unit cell segment 11 and 12 comprises either the rising half or the descending half of the wavelength, opposite the direction of rise or fall of the other sub-unit cell segment 11 or 12.

In the auxetic structure 1, the point of connection between adjacent sub-unit cell segments 11 or 12 in the strands may be referred to as a flex point 18. As seen in FIG. 5, there are four flex points 18 for each sub-unit cell 8. The flex points 18 are considerably more flexible than the nodes 14. Therefore, as shown in FIG. 13a, when tensile or expansion forces are applied to the sub-unit cell 8, the lattice 1 expands in the direction of both the x-axis and the y-axis. Alternatively and as shown in FIG. 13b, when compressive forces are applied to the sub-unit cell 8, the lattice 1 compresses in the direction of both the x-axis and the y-axis.

The sub-unit cell segments 11 and 12 of the auxetic unit cell 6 are linear. However, it is to be understood that the sub-unit cell segments could be of other shapes including, circular, conical (elliptical, parabolic, and hyperbolic) as in the elliptical auxetic structure 21 shown in FIG. 7, or sinusoidal as in the sinusoidal auxetic structure 22 shown in FIG. 8. The flex point 18 as discussed above, is formed at the point of inversion between sub-unit cell segments of adjacent sub-unit cells 8. The point of inversion being the point at which the direction of curvature changes.

FIGS. 9-12 show additional alternative embodiments of the auxetic structures of the present invention having connectors or cross-links connecting adjacent sub-unit cells 8. FIG. 9 shows an auxetic structure 24 which is a variation of auxetic structure 1 of FIG. 3. Auxetic structure 1 has been modified by forming linear connectors 26 between the ends of adjacent sub-unit cell segments 11 or 12 of the x and y axis strands 2 and 3. The linear connectors 26 generally form extended and flattened crests and troughs or peaks and valleys of each wave. Moreover, the linear connectors 26 create two flex points 28 between each set of adjacent sub-unit cell segments 11 or 12. The connectors further space the sub-unit cells 8 apart from one another while still maintaining the mirror image symmetry of each unit cell 6 about the x and y axis.

Figure 8:
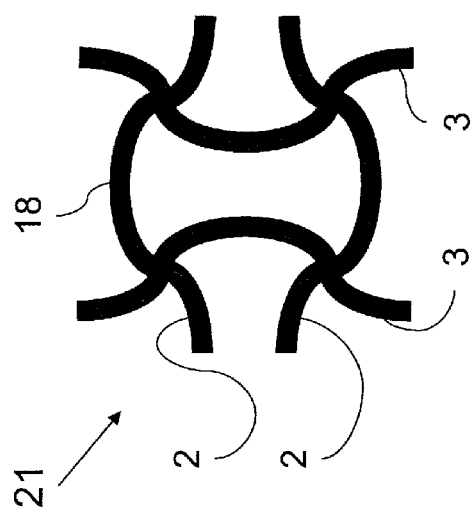
FIG. 8 is a front plan view of a unit cell of an alternative embodiment of an auxetic structure having strands of a sinusoidal wave form.

FIG. 10 shows a further alternative auxetic structure 32 which is a modification of the sinusoidal auxetic structure 22 of FIG. 8. Sinusoidal auxetic structure 22 has been modified by forming a sinusoidal connector 34 of one wavelength, between the ends of adjacent sub-unit cell segments 11 or 12 of the x and y axis strands 2 and 3. The sinusoidal connectors 34 generally create continuous flexion between each set of adjacent sub-unit cell segments 11 or 12. The connectors 34 also space the sub-unit cells 8 apart from one another while still maintaining the mirror image symmetry of each sub-unit cell 8 about x and y axis.

Figure 11:
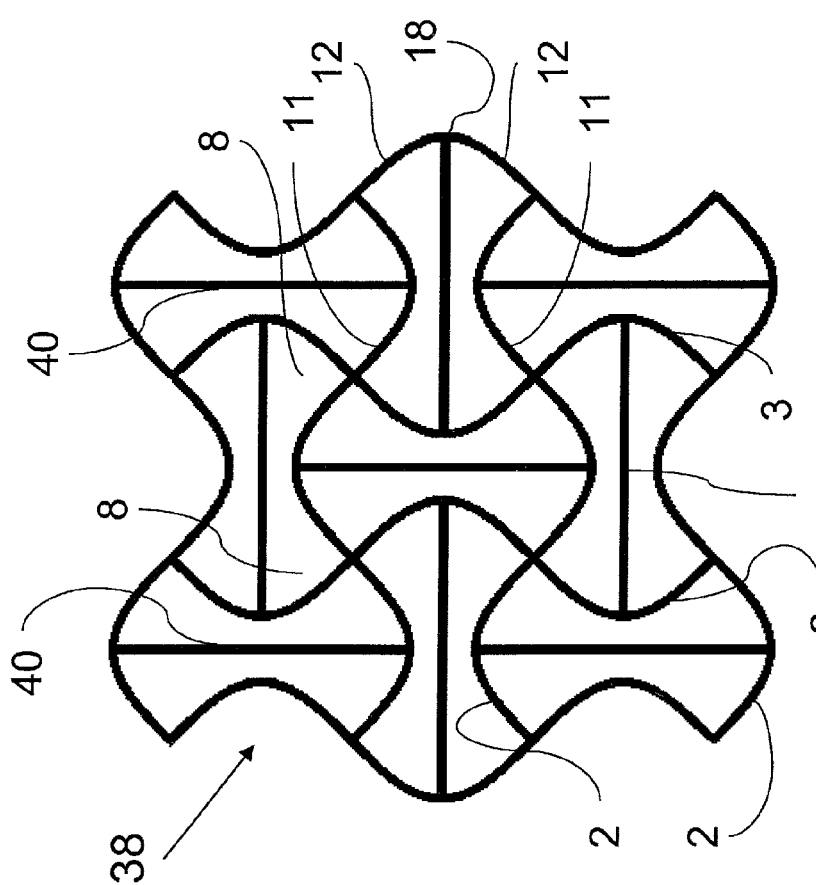
FIG. 11 is a front plan view of an alternative embodiment of a planar auxetic structure formed from sinusoidal strands having linear cross-links extending between ends of sub-unit cell segments.

FIG. 11 shows a further alternative auxetic structure 38 which is a modified version of the sinusoidal auxetic structure 22 of FIG. 8. In auxetic structure 38, the ends of adjacent sub-unit cell segments 11 or 12 abut one another as in structure 22. However, a cross-link 40 extends transverse to the ends of each sub-unit cell segment 11 and 12. The cross-links 40 extend between the ends of x-axis sub-unit cell segments 11 of adjacent x-axis strands 2 at their point of maximum spacing and between the ends of y-axis sub-unit cell segments 12 of adjacent y-axis strands 3 at their point of maximum spacing. Stated alternatively, the cross-links 40 connect or cross-link adjacent strands 2 or 3 at the point of intersection between adjacent sub-unit cell segments. As shown in FIG. 11, the cross-links 40 extend between the opposed peaks and valleys of adjacent strands 2 and of adjacent strands 3 at their widest spacing. However, it is foreseen that the cross links, could alternatively extend in an opposite direction or between opposed peaks and valleys at their narrowest spacing.

Figure 12:
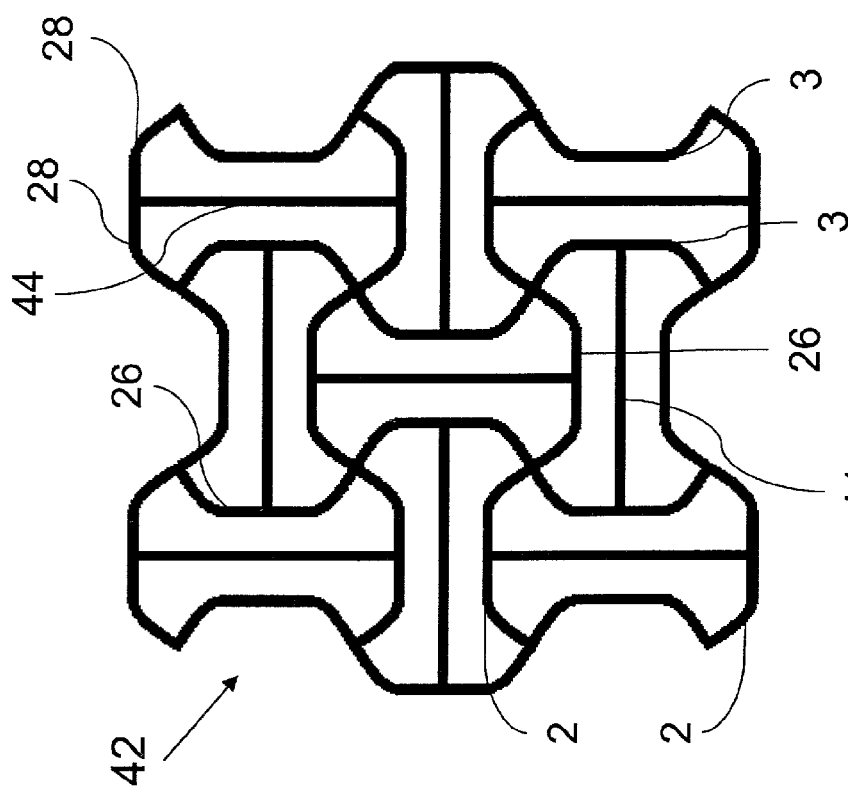
FIG. 12 is a front plan view of an alternative embodiment of a planar auxetic structure formed from sinusoidal strands having sub-unit cell segments connected by linear connectors and linear cross-links extending between adjacent linear connectors.

FIG. 12, shows a further alternative auxetic structure 42 which is a modified version of the auxetic structure 24 of FIG. 9. In auxetic structure 42 a cross-link 44 is formed on and extends transverse to the midpoint of each linear connector 26. The cross links 44 may also be described as extending between the opposed peaks and valleys of the adjacent strands 2 and of the adjacent strands 3 at their widest spacing. It is also foreseen that the cross links, could alternatively extend in an opposite direction or between the opposed peaks and valleys at their narrowest spacing.

It is foreseen that additional variations of the various lattices shown could be developed with a negative Poisson's ratio. The structural properties of such auxetic structures, including those shown in FIGS. 9-12 depend upon the elastic properties of the material of the strands 2 and 3 and connectors or cross-links, dimensions and cross section of the strands and connectors, angle between the strands of a joint $\alpha$, orientation of the joint with respect to principal coordinate directions $\beta$. Furthermore, each of these structures exhibits orthotropic auxetic nature, as depicted in FIGS. 13A, 13B, 14A and 14B, thereby expanding laterally when stretched (FIGS. 13A and B) and contracting laterally when compressed (14A and B). The auxetic nature of these structures is a result of the simultaneous rotation and expansion of the strand joints 14 about the intersection of the planes of symmetry Z, hence named Rotational Expansion Novel Auxetic (RENA) structures. A typical planar auxetic structure designed using the structure shown in FIG. 11 exhibits a Poisson's ratio of the order of −1.1.

Figure 15B:
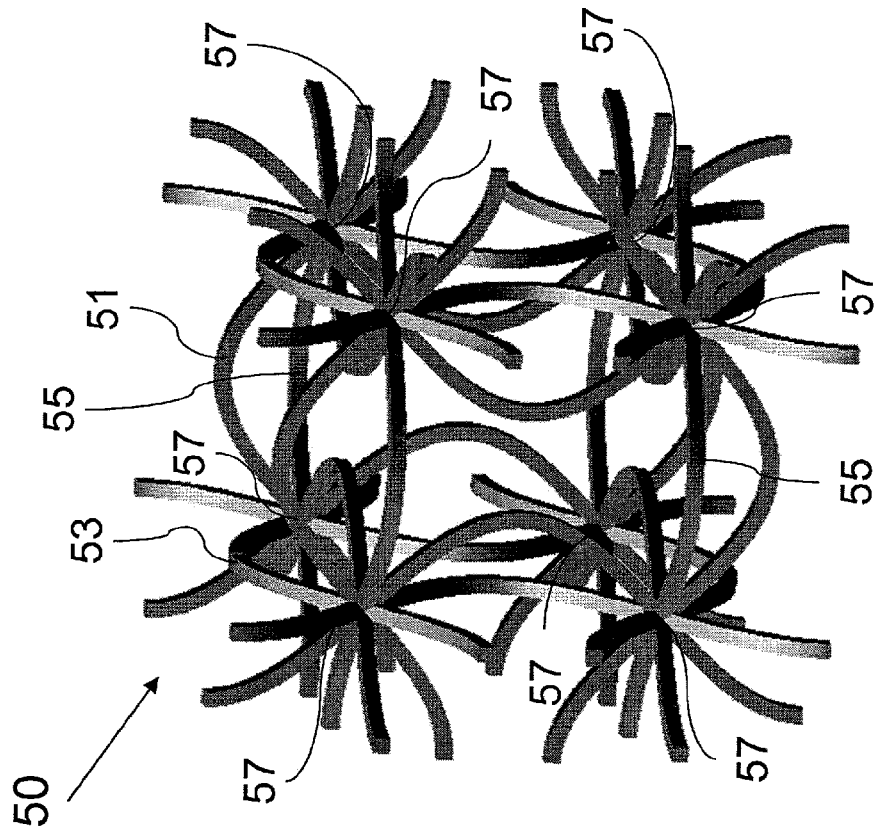
FIG. 15B is a fragmentary perspective view of the three-dimensional auxetic structure shown in FIG. 15A.
Figure 15A:
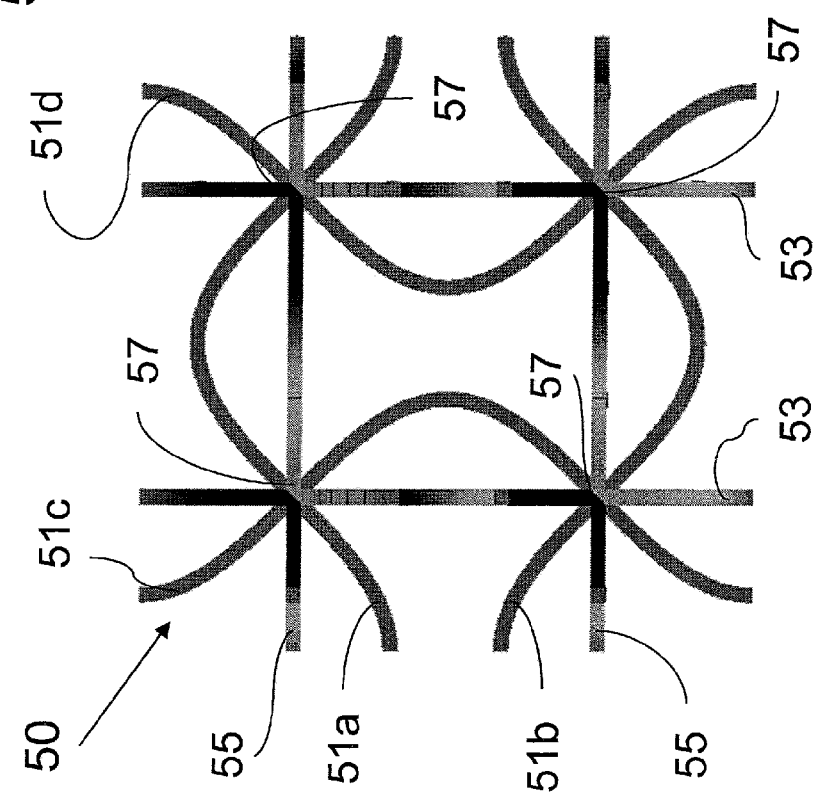
FIG. 15A is a fragmentary plan view of a three-dimensional auxetic structure formed from planar auxetic structures formed from sinusoidal strands with the planar auxetic structure arranged in transverse planes.

Fragmentary, orthographic and isometric views of a three-dimensional stacked arrangement of planar auxetic structures 22 of FIG. 8 are shown in FIGS. 15A and 15B, respectively with the three-dimensional structure designated as reference number 50. The fragmentary views show the three-dimensional arrangement on the level of a single unit cell 6, which is repeated in all three dimensions. The resultant three-dimensional structure also exhibits orthotropic auxetic nature.

Referring to FIG. 15A, reference numerals 51a-d designate strands of a first planar sinusoidal auxetic structure 51 which may be described as extending in an xy axis plane. Additional, corresponding planar sinusoidal auxetic structures extending in an xy axis plane are positioned in parallel xy axis planes directly behind and in front thereof in equally spaced relationship. The lines designated 53 are end views of second planar sinusoidal auxetic structures oriented perpendicular to the first planar auxetic structures 51 in what may be referred to as yz axis planes. And the lines designated 55 are end views of third planar sinusoidal auxetic structures oriented perpendicular to the first planar auxetic structures 51 in what may be referred to as zx axis planes.

In forming the three-dimensional structure 50, the node 57 or point at which three separate planar auxetic structures 51, 53 and 55 intersect corresponds to unit cell nodes 14 on each of the planar auxetic structures 51, 53 and 55. In other words, nodes 14 on the three planar auxetic structures 51, 53 and 55 that come together at node 57 are aligned or brought into registration to form the node 57.

Figure 16B:
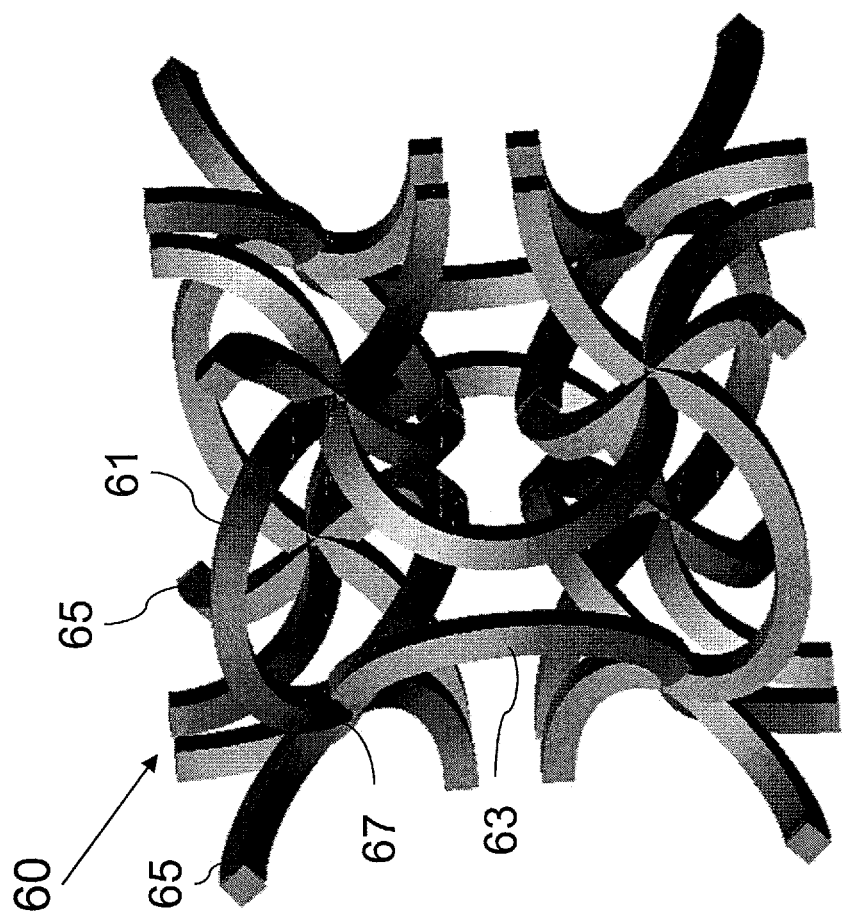
FIG. 16B is a fragmentary perspective view of the three-dimensional auxetic structure shown in FIG. 16A.
Figure 16A:
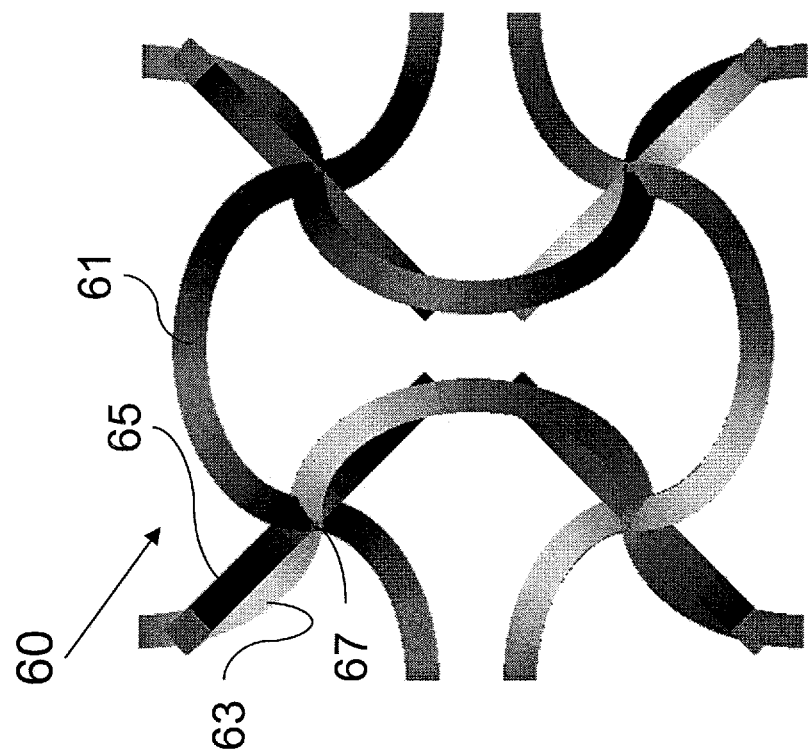
FIG. 16A is a fragmentary plan view of a three-dimensional auxetic structure formed from planar auxetic structures formed from sinusoidal strands with the planar auxetic structures arranged in planes extending at forty-five degrees relative to each other.

The planar auxetic structures forming the three dimensional auxetic structure may be oriented at angles other than ninety degrees. FIGS. 16A and B shown orthographic and isometric views of a three-dimensional auxetic structure 60 wherein the planar auxetic structures are arranged at angles of forty-five degrees relative to one another. The planar auxetic structures 21 forming the three-dimensional auxetic structure 60 are of the type shown in FIG. 7. Referring to FIG. 16A, first, second and third planar auxetic structures 61, 63 and 65 respectively each angled at a 45° angle relative to one another intersect at node 67 which corresponds to sub-unit cell nodes 14 for each of the planar auxetic structures. Typical three-dimensional auxetic structures of the type shown in FIGS. 15A-B and 16A-B exhibit a Poisson's ratio of the order of −0.7.

FIGS. 17 A-C show a cylindrical auxetic structure 70 formed from the sinusoidal planar auxetic structure 38 with cross-links 40 as shown in FIG. 11. The circumference of the cylindrical auxetic structure 70 is formed from three unit cells 6 and is approximately five unit cells 6 in length. Referring to FIG. 18, a cylindrical auxetic structure 72 is formed from the sinusoidal planar auxetic unit cell 22 shown in FIG. 8, with six unit cells 6 along the circumference and eight unit cells in length. Cylindrical auxetic structures, such as structures 70 and 72 are particularly well adapted for use as cardiovascular stents. Due to the negative Poisson's ratio associated with such structures, the structures are more rigid or more difficult to compress in their expanded state than they are in a compressed state. A stent formed from auxetic structure 72 can be compressed and inserted into an artery and then allowed to expand to open and support a partially clogged artery.

Figure 7:
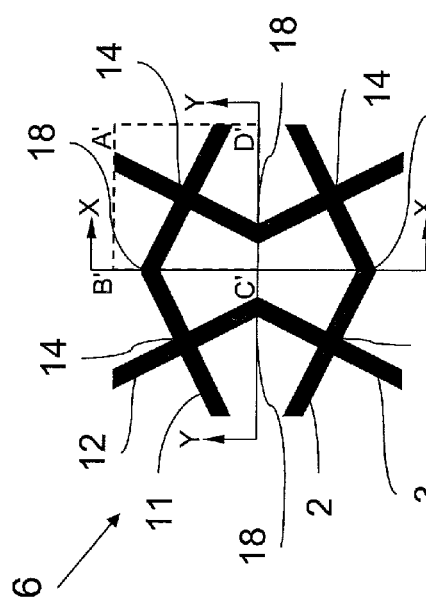
FIG. 7 is a front plan view of a unit cell of an alternative embodiment of an auxetic structure having strands of an elliptical wave form.
Figure 19C:
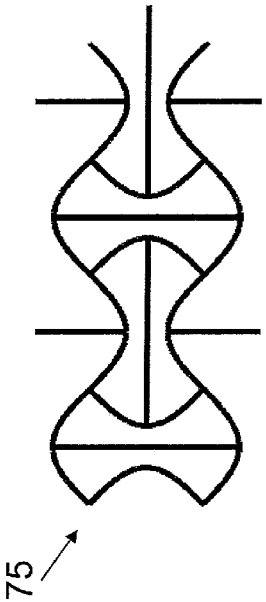
FIG. 19C is a planar projection of the lattice forming the spherical auxetic structure shown in FIGS. 19A and B.
Figure 19B:
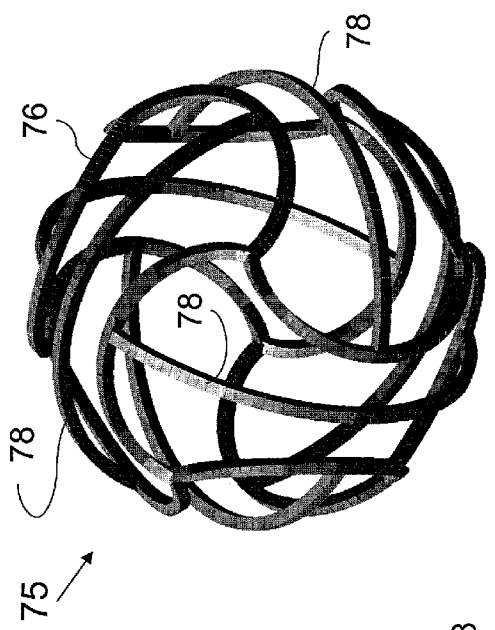
FIG. 19B is a perspective view of the spherical auxetic structure shown in FIG. 19A.
Figure 19A:
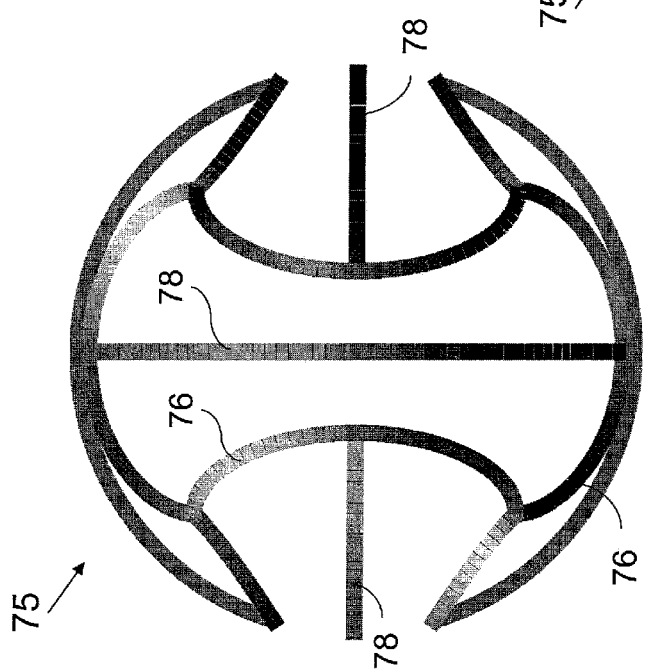
FIG. 19 A is a front plan view of a spherical auxetic structure formed from strands of an elliptical wave form and linear cross-links and two unit cells along the circumference.
Figure 20B:
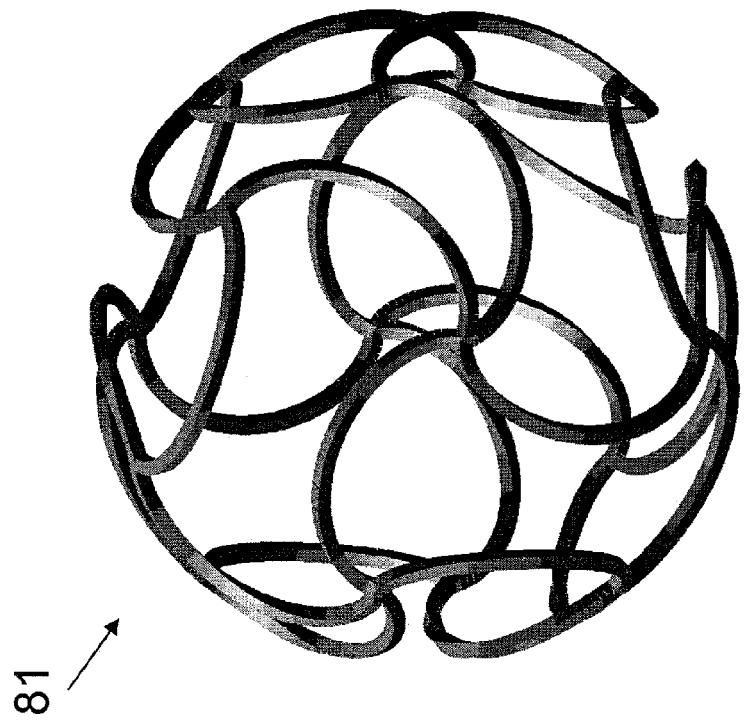
FIG. 20B is a perspective view of the spherical auxetic structure of FIG. 20A.
Figure 20A:
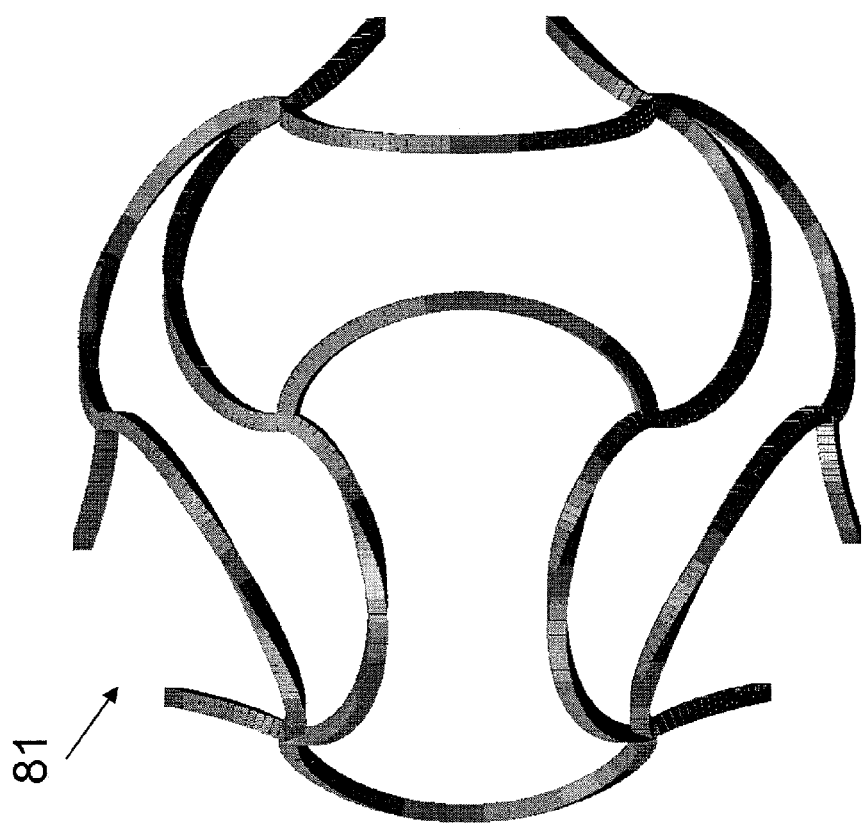
FIG. 20A is a front plan view of an alternative embodiment of a spherical auxetic structure or lattice formed from strands of an elliptical wave form and three unit cells along the circumference.
Figure 21B:
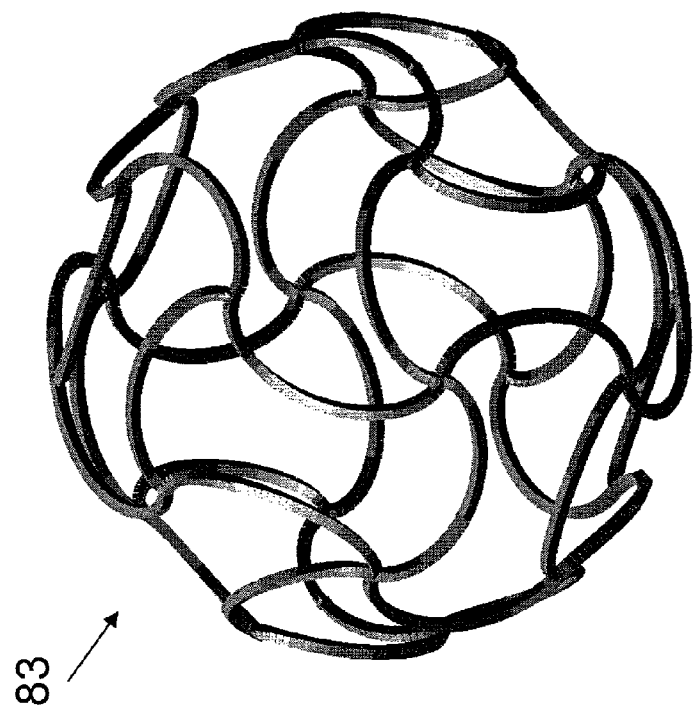
FIG. 21B is a perspective view of the spherical auxetic structure of FIG. 21A.
Figure 21A:
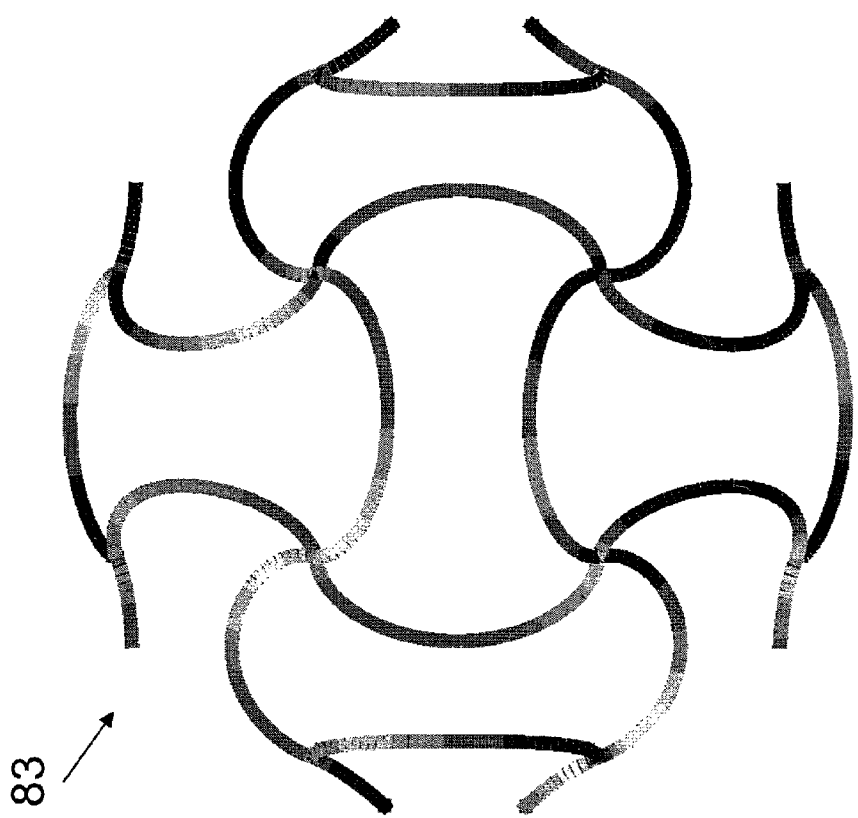
FIG. 21A is a front plan view of an alternative embodiment of a spherical auxetic structure or lattice formed from strands of an elliptical wave form and four unit cells along the circumference.

FIGS. 19A and 19B are orthographic and isometric views respectively of a spherical auxetic structure 75 designed based on a planar auxetic structure having strands 76 of an elliptical waveform, such as structure 21 shown in FIG. 7, and with cross-links 78 extending generally transverse to the ends of the sub-unit cell segments. FIG. 19C is a planar projection of the lattice forming the spherical auxetic structure 75 shown in FIGS. 19A and B. Spherical auxetic structure 75 includes two unit cells 6 along the circumference. Referring to FIGS. 20A and 20B, spherical auxetic structure 81 is similarly formed from unit cells of the elliptical type as in structure 21 of FIG. 7 without cross-links. The spherical auxetic structure 81 incorporates three unit cells along the circumference. Referring to FIGS. 21A and 21B, spherical auxetic structure 83 is formed similarly to structure 81, except that it incorporates four unit cells along the circumference.

The structures, 75, 81 and 83 shown in FIGS. 19-21 respectively are representative of such spherical structures formed by wires or the like. It is to be understood however, that the spherical structures 75, 81 and 83 could be formed by panels sewn or held together by seams having the configuration of the lines or wires shown in FIGS. 19-21.

Figure 22B:
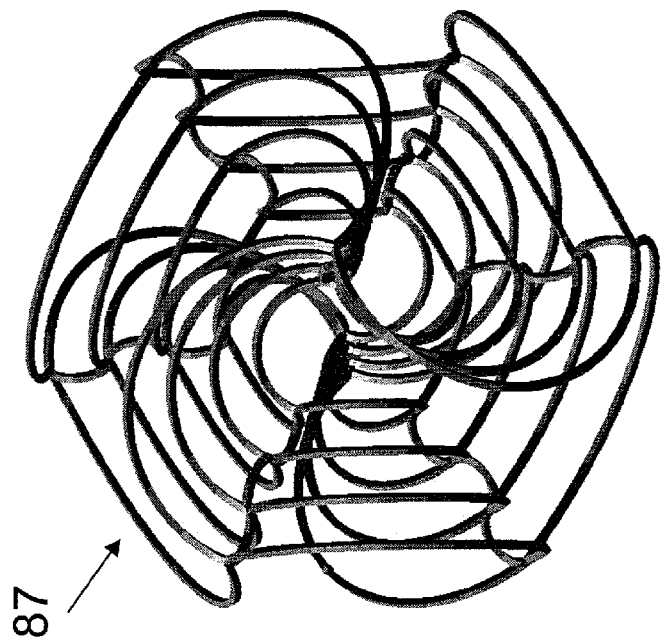
FIG. 22B is a perspective view of the spherical auxetic structure of FIG. 22A.
Figure 22A:
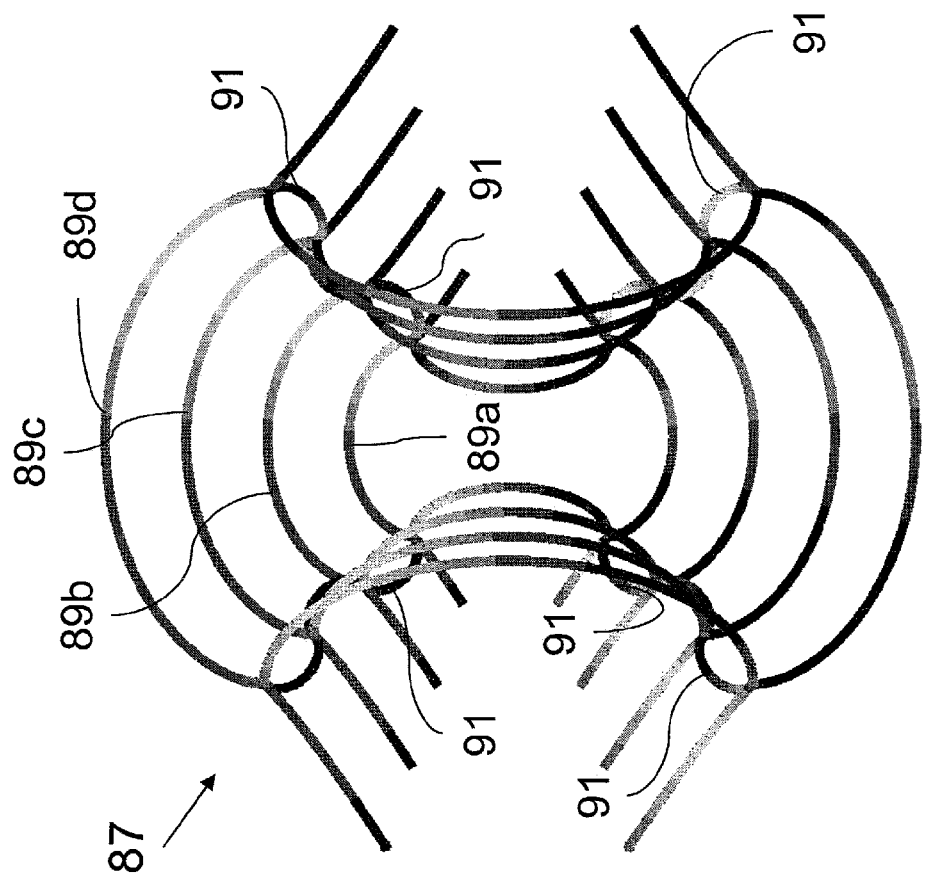
FIG. 22A is a front plan view of radially stacked arrangement of spherical auxetic structures formed from strands of an elliptical wave form and formed from two unit cells along the circumference which are connected by elliptical strands.

FIGS. 22A and 22B are orthogonal and isometric views respectively of a radially stacked arrangement 87 of spherical auxetic structures 89a-d connected by connectors 91 which maintain the auxetic properties of the structure. The spherical auxetic structures 89a-d shown in FIGS. 22A and 22B are designed based on a planar auxetic structure having strands of an elliptical waveform and are similar to the spherical auxetic structures 75 of FIGS. 19A and 19B, but without cross-links. Each spherical auxetic structure 89a-d is of increasing diameter to create sphere 89a within sphere 89b within sphere 89c within sphere 89d. Connectors 91 are used to connect adjacent spheres and preferably are also formed from the same elliptical waveform.

Figure 23B:
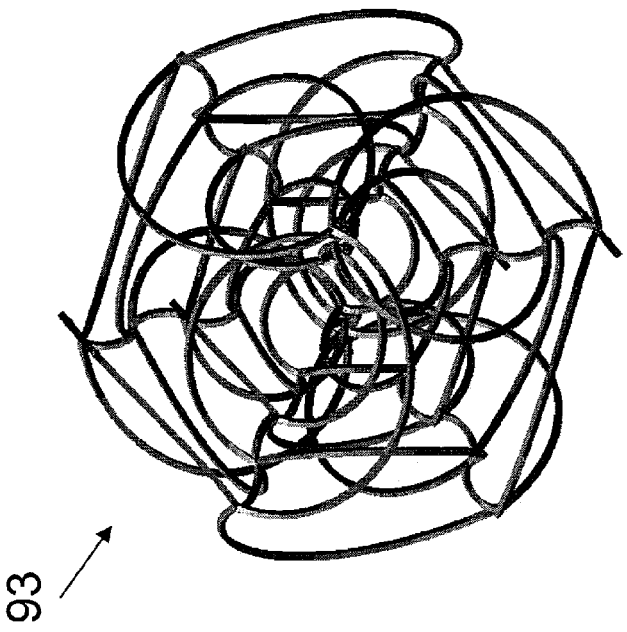
FIG. 23B is a perspective view of the spherical auxetic structure of FIG. 23A.
Figure 23A:
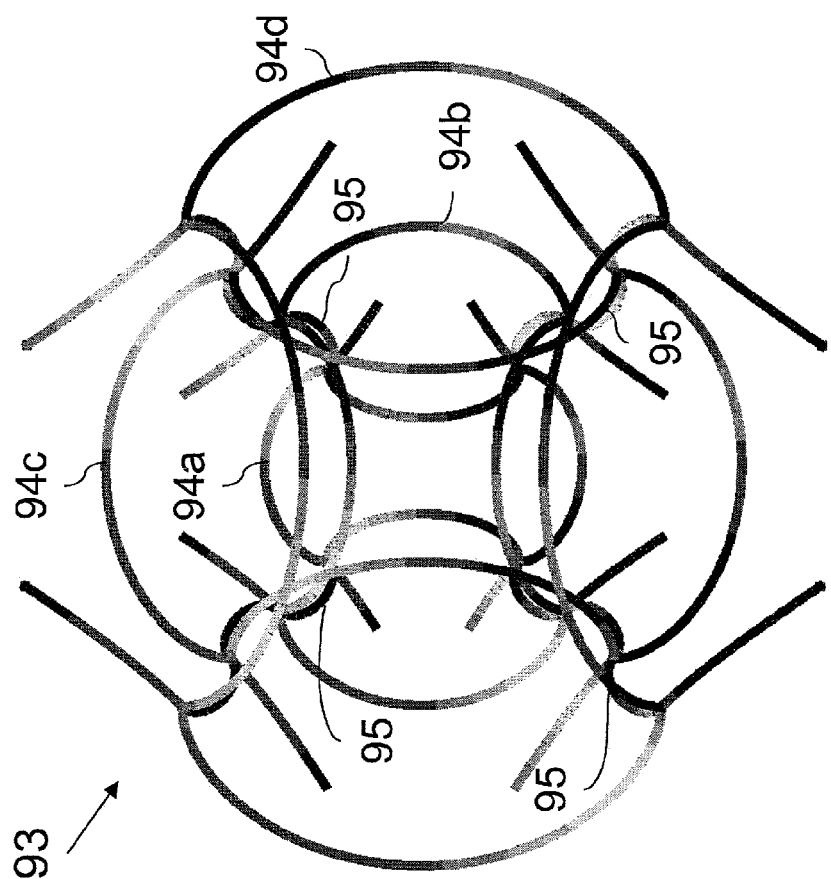
FIG. 23A is a front plan view of alternative embodiment of a radially stacked arrangement of spherical auxetic structures formed from strands of an elliptical wave form and formed from two unit cells along the circumference which are connected by elliptical strands in which each spherical auxetic structure is offset ninety degrees relative to one another.

In the radially stacked auxetic structure 87, the individual spherical structures 89a-d, the circumferential or radial alignment of the pattern of each sphere 89a-d is generally aligned. FIGS. 23A and 23B show orthogonal and isometric views respectively of another radially stacked arrangement 93 of spherical auxetic structures 94a-d connected by connectors 95 wherein each spherical auxetic structure 94a-d is generally rotated 90 degrees about a vertical axis relative to the adjacent spherical auxetic structures 94a-d.

Figure 25A:
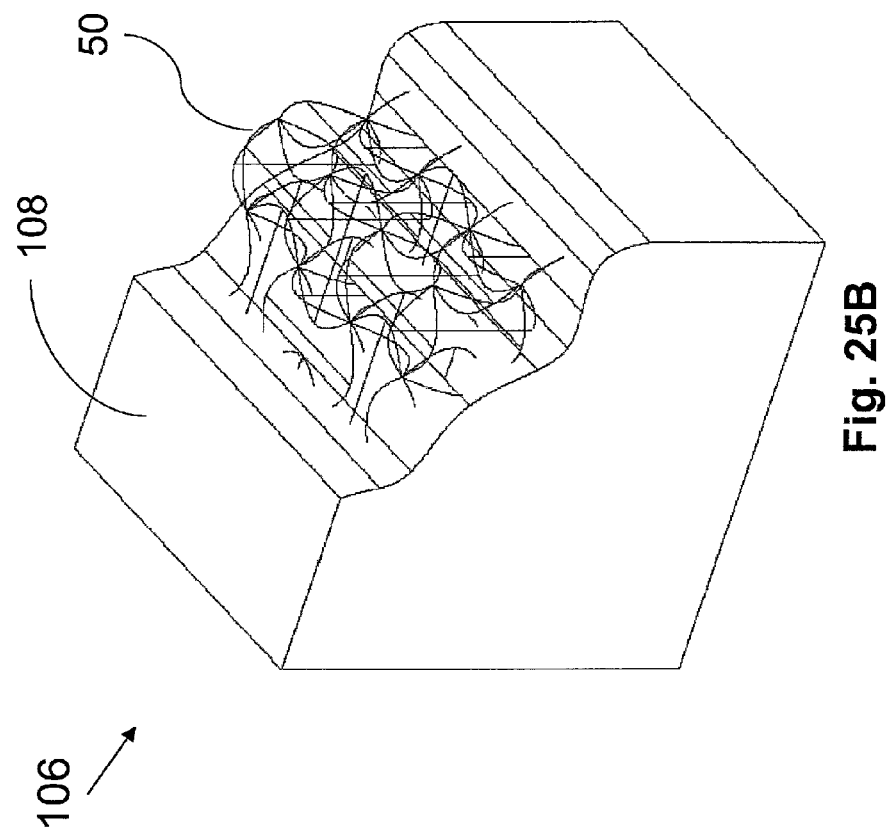
FIG. 25A is a front plan view of composite structure formed by molding a plastic material around a three-dimensional auxetic structure.
Figure 25B:
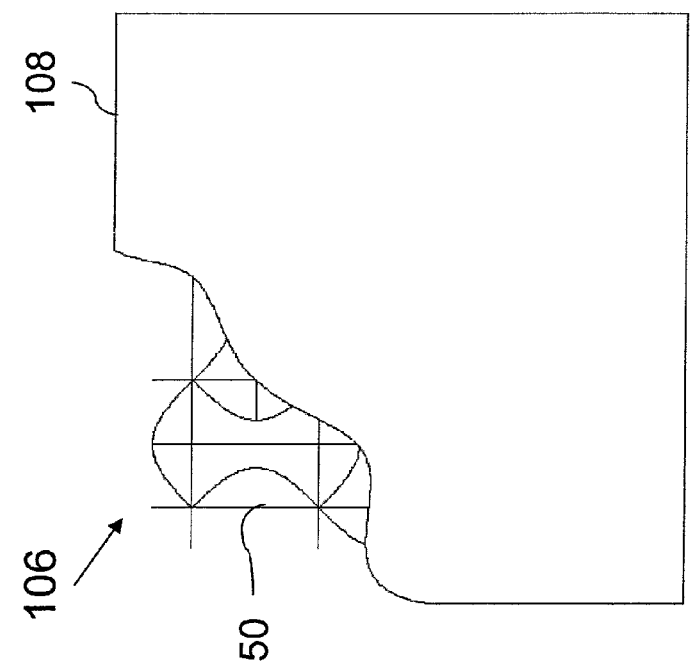
FIG. 25B is a perspective view of the composite structure of FIG. 25A.

FIGS. 24A and B show side and perspective views of a composite structure 101 formed from plastic material 103 molded or otherwise formed around a planar auxetic structure or lattice 38 of the type shown in FIG. 11. FIGS. 25A and B show side and perspective views of a composite structure 106 formed from plastic material 108 molded or otherwise formed around a three-dimensional auxetic structure or lattice 50 of the type shown in FIG. 15A. The auxetic structures 38 and 50 may be formed of any suitable material such as rods or wires formed from plastic, steel, glass or other suitable material. It is to be understood that any of the auxetic structures disclosed herein or created in accordance with the principles disclosed herein may be used to support a body of plastic material. It is also to be understood that as used herein the term plastic is intended to include materials soft enough to be molded or formed around the auxetic structure yet capable of hardening into a desired, fixed form. As used herein, plastics would include thermoset resins and concrete in addition to conventional moldable plastics.

Figure 26:
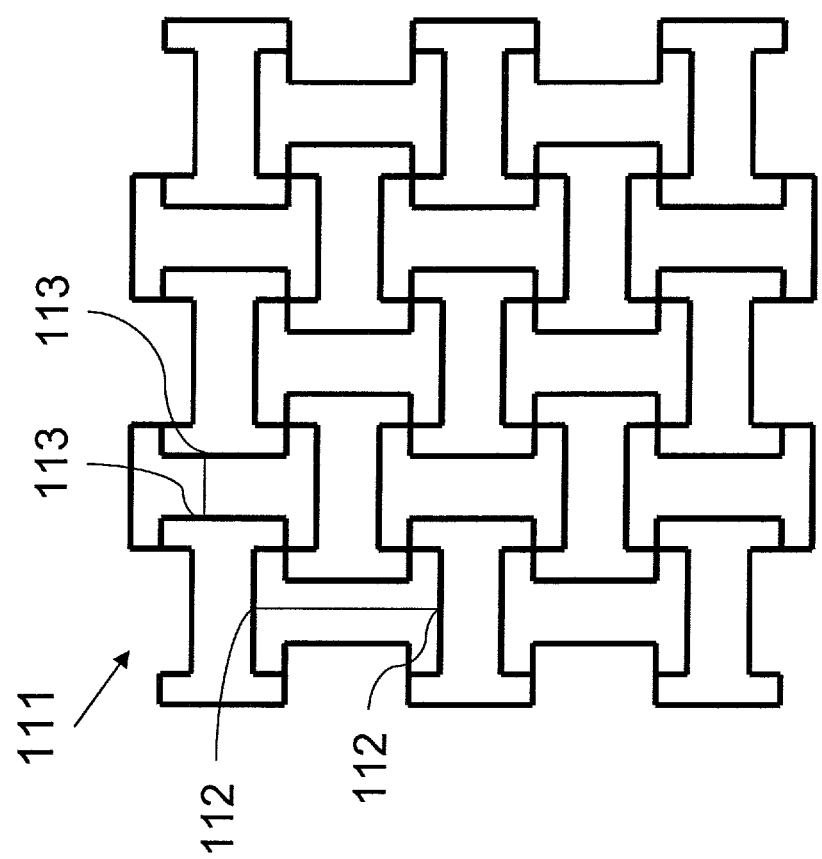
FIG. 26 is a front plan view of an alternative embodiment of a planar auxetic structure formed from strands having a stepped wave form.

FIG. 26 shows a further alternative planar auxetic structure 111 including x-axis and y-axis strands 112 and 113 having a stepped waveform.

Various combinations of planar, three-dimensional, cylindrical, and spherical auxetic structures multiplied by the combinations of strands and connectors result in an array of auxetic structures that can be tailored to exhibit the desired structural properties which can be manufactured to scale and dimensions in accordance with the application under consideration. Details of the present invention are exemplified in this document so that one skilled in the art could apply the present invention in any appropriate form and achieve the desired results. However, the disclosed embodiments are merely exemplary of the invention, which may be embodied in various forms. Specific structural and functional details disclosed in this document should not be interpreted as limiting, but merely as a basis for the claims.

Auxetic materials of various scales and dimensions can be manufactured using standard casting and die casting techniques. However, dimensional and material limitations apply according to the employed manufacturing technique. Planar auxetic materials can be manufactured from sheets of appropriate thickness by blanking. Embossing or adhering a planar auxetic structure to a sheet of similar material and thickness renders the latter to exhibit auxetic orthotropic behavior. Planar, cylindrical and polar auxetic structures and materials can be manufactured using standard machining techniques. For instance, auxetic bare metal stents can be mass produced by laser cutting from tubes of desired thickness. Auxetic textiles may also be manufactured by braiding or weaving a combination of strong and elastomeric fibers according to the auxetic strand patterns. Auxetic composites can be manufactured by embedding planar, cylindrical and spherical auxetic materials or textiles into an appropriate matrix. Furthermore, auxetic assemblies of a wide range of scales can also be assembled from their individual strands with appropriate joint designs.

Negative Poisson's ratio, high shear modulus and low bulk modulus, high fracture toughness, high impact resistance due to greater elastic energy absorption, and high indentation resistance are some of the inherent characteristics of auxetic materials. These unique characteristics make auxetic structures and materials highly desirable for applications in a wide variety of industries including aerospace and biomedical engineering. Forming prosthetic materials and an array of medical devises including vessel dilators and stents from materials exhibiting a negative Poisson's ratio can be advantageous. A cylindrical auxetic structure exhibits higher circumferential stiffness with expansion and lower flexural stiffness with compression, which is an ideal characteristic for stent applications. The absence of stent shortening during deployment, and lesser radial expansion at the ends due to inverted Saint-Venant's end conditions are advantageous characteristics for stents. A stent designed based on the planar auxetic structure in FIG. 11 with sinusoidal strands 2 and 3, cross-links 40 and an odd-numbered unit cells along the circumference, similar to the cylindrical auxetic structure 70 shown in FIGS. 17 A-C exhibits the aforementioned characteristics.

Pressure sensitive de-fouling equipment can be designed using planar, 3-dimensional, cylindrical and polar auxetic structures and combinations thereof.

Composite sandwich panels formed with auxetic materials, such as those shown in FIGS. 24A & B and 25A & B may find a wide variety of applications in aerospace industry due to the lower stress concentration at holes, saddle shaped deformation of shells, high shear strength, and greater impact resistance due to high elastic energy absorption. For instance, auxetic composites can outperform conventional composites in aircraft structure, wing and fuselage design.

High impact resistance due to greater elastic energy storage is a characteristic desirable of materials for impact and damping applications. Auxetic materials exhibit such characteristics due to their low bulk modulus, such that highly sensitive shock-absorbing equipment can be manufactured from such auxetic structures for a wide variety of applications in the automotive, aerospace, sporting, comfort, textile and biomedical fields. For example, spherical sporting equipment with spherical auxetic seam patterns shown in FIGS. 19-23 exhibit a dynamic stability that can not be achieved by conventional patterns.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed and desired to be secured by this utility patent is as follows:

1. An auxetic structure formed from a plurality of x-axis strands and y-axis strands wherein each of said x-axis strands comprises a wave pattern oscillating about an axis extending in parallel relation to an x-axis and each of said y-axis strands comprises a wave pattern oscillating abut an axis extending in parallel relation to a y-axis; the wave pattern of each x-axis strand is offset from the wave pattern of each adjacent x-axis strand by 180 degrees and the wave pattern of each y-axis strand is offset from the wave pattern of each adjacent y-axis strand by 180 degrees; said x-axis strands and said y-axis strands being joined together at nodes where said x-axis strands and said y-axis strands intersect, and wherein an x-axis sub-unit cell segment comprising a portion of said x-axis strand of ½ a wavelength and a y-axis sub-unit cell segment comprising a portion of said y-axis strand of ½ a wavelength extend through each joint to form a sub-unit cell and wherein each sub unit cell is a mirror image of each adjacent sub-unit cell both across axis extending parallel to the x-axis and across axis extending parallel to the y-axis; wherein at least one x-axis flex point is formed on each of said x-axis strands between adjacent x-axis sub-unit cell segments and said x-axis flex points are more flexible than said nodes; and wherein at least one y-axis flex point is formed on each of said x-axis strands between adjacent y-axis sub unit cell segments and said y-axis flex points are more flexible than said nodes.

2. The auxetic structure as in claim 1 wherein said wave pattern is triangular.

3. The auxetic structure as in claim 1 wherein said wave pattern is sinusoidal.

4. The auxetic structure as in claim 1 wherein said wave pattern is elliptical.

5. The auxetic structure as in claim 1 wherein each x-axis sub-unit cell segment is separated from an adjacent x-axis sub-unit cell segment by a connector and each y-axis sub-unit cell segment is separated from an adjacent y-axis sub-unit cell segment by a connector.

6. The auxetic structure as in claim 5 wherein said connectors are linear.

7. A cylindrical auxetic structure wherein said auxetic structure as in claim 1 is formed into a cylinder.

8. A spherical auxetic structure having a planar projection comprising a auxetic structure as in claim 1.

9. A composite material comprising a plastic material formed around the auxetic structure of claim 1.

10. The auxetic structure in claim 1 wherein a first of said x-axis sub-unit cell segment and said y-axis sub-unit cell segment of each said sub-unit cell comprises a rising half of a wavelength of the respective x-axis strand or y-axis strand and a second of said x-axis sub-unit cell segment and said y-axis sub-unit cell segment of each said sub-unit cell comprises a falling half of a wavelength of the respective x-axis strand or y-axis strand.

11. The auxetic structure as in claim 1 wherein a cross-link extends between ends of x-axis sub-unit cell segments of adjacent x-axis strands that are spaced apart at a maximum spacing and a cross-link extends between ends of y-axis sub-unit cell segments of adjacent y-axis strands that are spaced apart at a maximum spacing.

12. An auxetic structure formed from a plurality of x-axis strands and y-axis strands wherein each of said x-axis strands comprises a wave pattern oscillating about an axis extending in parallel relation to an x-axis and each of said y-axis strands comprises a wave pattern oscillating abut an axis extending in parallel relation to a y-axis; the wave pattern of each x-axis strand is offset from the wave pattern of each adjacent x-axis strand by 180 degrees and the wave pattern of each y-axis strand is offset from the wave pattern of each adjacent y-axis strand by 180 degrees; said x-axis strands and said y-axis strands being joined together at joints where said x-axis strands and said y-axis strands intersect, and wherein an x-axis sub-unit cell segment comprising a portion of said x-axis strand of ½ a wavelength and a y-axis sub-unit cell segment comprising a portion of said y-axis strand of ½ a wavelength extend through each joint to form a sub-unit cell and wherein each sub unit cell is a mirror image of each adjacent sub-unit cell both across axis extending parallel to the x-axis and across axis extending parallel to the y-axis; wherein each x-axis sub-unit cell segment is separated from an adjacent x-axis sub-unit cell segment by a sinusoidal connector and each y-axis sub-unit cell segment is separated from an adjacent y-axis sub-unit cell segment by a sinusoidal connector.

13. A three dimensional auxetic structure comprising:
a plurality of auxetic structures formed from a plurality of x-axis strands and y-axis strands wherein each of said x-axis strands comprises a wave pattern oscillating about an axis extending in parallel relation to an x-axis and each of said y-axis strands comprises a wave pattern oscillating abut an axis extending in parallel relation to a y-axis; the wave pattern of each x-axis strand is offset from the wave pattern of each adjacent x-axis strand by 180 degrees and the wave pattern of each y-axis strand is offset from the wave pattern of each adjacent y-axis strand by 180 degrees; said x-axis strands and said y-axis strands being joined together at joints where said x-axis strands and said y-axis strands intersect, and wherein an x-axis sub-unit cell segment comprising a portion of said x-axis strand of ½ a wavelength and a y-axis sub-unit cell segment comprising a portion of said y-axis strand of ½ a wavelength extend through each joint to form a sub-unit cell and wherein each sub unit cell is a mirror image of each adjacent sub-unit cell both across axis extending parallel to the x-axis and across axis extending parallel to the y-axis; wherein
a plurality of said auxetic structures extend in parallel xy axis planes;
a plurality of said auxetic structures extend in parallel yz axis planes; and
a plurality of said auxetic structures extend in parallel zx axis planes; and
wherein intersections between each xy axis auxetic structure with a yz axis auxetic structure and a zx axis auxetic structure are formed at joints of said respective auxetic structures.

14. A composite material comprising a plastic material formed around the three dimensional auxetic structure of claim 13.

15. An auxetic structure formed from a plurality of x-axis strands and y-axis strands wherein each of said x-axis strands comprises a sinusoidal wave pattern oscillating about an axis extending in parallel relation to an x-axis and each of said y-axis strands comprises a sinusoidal wave pattern oscillating abut an axis extending in parallel relation to a y-axis; the sinusoidal wave pattern of each x-axis strand is offset from the sinusoidal wave pattern of each adjacent x-axis strand such that the peaks and valleys of one x-axis strand are aligned with the valleys and peaks respectively of each adjacent x-axis strand and the sinusoidal wave pattern of each y-axis strand is offset from the sinusoidal wave pattern of each adjacent y-axis strand such that the peaks and valleys of one y-axis strand are aligned with the valleys and peaks respectively of each adjacent y-axis strand; said x-axis strands and said y-axis strands being joined together at nodes where said x-axis strands and said y-axis strands intersect, and wherein an x-axis sub-unit cell segment comprising a portion of said x-axis strand of ½ a wavelength and a y-axis sub-unit cell segment comprising a portion of said y-axis strand of ½ a wavelength extend through each joint to form a sub-unit cell and wherein each sub unit cell is a mirror image of each adjacent sub-unit cell both across axis extending parallel to the x-axis and across axis extending parallel to the y-axis; wherein at least one x-axis flex point is formed on each of said x-axis strands between adjacent x-axis sub-unit cell segments and said x-axis flex points are more flexible than said nodes; and wherein at least one y-axis flex point is formed on each of said x-axis strands between adjacent y-axis sub unit cell segments and said y-axis flex points are more flexible than said nodes.

16. The auxetic structure as in claim 15 wherein each x-axis sub-unit cell segment is separated from an adjacent x-axis sub-unit cell segment by a connector and each y-axis sub-unit cell segment is separated from an adjacent y-axis sub-unit cell segment by a connector.

17. The auxetic structure as in claim 15 wherein a cross-link extends between ends of x-axis sub-unit cell segments of adjacent x-axis strands that are spaced apart at a maximum spacing and a cross-link extends between ends of y-axis sub-unit cell segments of adjacent y-axis strands that are spaced apart at a maximum spacing.

18. A cylindrical auxetic structure wherein said auxetic structure as in claim 15 is formed into a cylinder.

19. A spherical auxetic structure having a planar projection comprising the auxetic structure as in claim 15.

20. A composite material comprising a plastic material formed around auxetic structure of claim 15.

21. The auxetic structure in claim 15 wherein a first of said x-axis sub-unit cell segment and said y-axis sub-unit cell segment of each said sub-unit cell comprises a rising half of a wavelength of the respective x-axis strand or y-axis strand and a second of said x-axis sub-unit cell segment and said y-axis sub-unit cell segment of each said sub-unit cell comprises a falling half of a wavelength of the respective x-axis strand or y-axis strand.

22. A three dimensional auxetic structure comprising;
a plurality of auxetic structures formed from a plurality of x-axis strands and y-axis strands wherein each of said x-axis strands comprises a sinusoidal wave pattern oscillating about an axis extending in parallel relation to an x-axis and each of said y-axis strands comprises a sinusoidal wave pattern oscillating abut an axis extending in parallel relation to a y-axis; the sinusoidal wave pattern of each x-axis strand is offset from the sinusoidal wave pattern of each adjacent x-axis strand such that the peaks and valleys of one x-axis strand are aligned with the valleys and peaks respectively of each adjacent x-axis strand and the sinusoidal wave pattern of each y-axis strand is offset from the sinusoidal wave pattern of each adjacent y-axis strand such that the peaks and valleys of one y-axis strand are aligned with the valleys and peaks respectively of each adjacent y-axis strand; said x-axis strands and said y-axis strands being joined together at joints where said x-axis strands and said y-axis strands intersect, and wherein an x-axis sub-unit cell segment comprising a portion of said x-axis strand of ½ a wavelength and a y-axis sub-unit cell segment comprising a portion of said y-axis strand of ½ a wavelength extend through each joint to form a sub-unit cell and wherein each sub unit cell is a mirror image of each adjacent sub-unit cell both across axis extending parallel to the x-axis and across axis extending parallel to the y-axis; wherein
a plurality of said auxetic structures extend in parallel xy axis planes;
a plurality of said auxetic structures extend in parallel yz axis planes; and
a plurality of said auxetic structures extend in parallel zx axis planes; and
wherein intersections between each xy axis auxetic structure with a yz axis auxetic structure and a zx axis auxetic structure are formed at joints of said respective auxetic structures.

23. A composite material comprising a plastic material formed around the three dimensional auxetic structure of claim 22.

24. A planar auxetic structure formed from a plurality of x-axis strands and y-axis strands wherein each of said x-axis strands comprises a wave pattern oscillating about an axis extending in parallel relation to an x-axis and each of said y-axis strands comprises a wave pattern oscillating abut an axis extending in parallel relation to a y-axis; the wave pattern of each x-axis strand is offset from the wave pattern of each adjacent x-axis strand by 180 degrees and the wave pattern of each y-axis strand is offset from the wave pattern of each adjacent y-axis strand by 180 degrees; said x-axis strands and said y-axis strands being joined together at joints where said x-axis strands and said y-axis strands intersect, and wherein an x-axis sub-unit cell segment comprising a portion of said x-axis strand of ½ a wavelength and a y-axis sub-unit cell segment comprising a portion of said y-axis strand of ½ a wavelength extend through each joint to form a sub-unit cell and wherein each sub unit cell is a mirror image of each adjacent sub-unit cell both across axis extending parallel to the x-axis and across axis extending parallel to the y-axis; wherein a cross-link extends between ends of x-axis sub-unit cell segments of adjacent x-axis strands that are spaced apart at a maximum spacing and a cross-link extends between ends of y-axis sub-unit cell segments of adjacent y-axis strands that are spaced apart at a maximum spacing.

25. A cylindrical auxetic structure wherein said planar auxetic structure as in claim 24 is formed into a cylinder.

\* \* \* \* \*